No. 860,674. PATENTED JULY 23, 1907.
G. W. LAMSON.
PLASTIC PAVEMENT PLANT.
APPLICATION FILED APR. 6, 1907.

Witnesses
Frank A. Fahle
Thomas W. McMeans

Inventor
George W. Lamson
By
Bradford Hood
Attorneys

UNITED STATES PATENT OFFICE.

GEORGE W. LAMSON, OF CHICAGO, ILLINOIS.

PLASTIC-PAVEMENT PLANT.

No. 860,674.  Specification of Letters Patent.  Patented July 23, 1907.

Application filed April 6, 1907. Serial No. 366,655.

*To all whom it may concern:*

Be it known that I, GEORGE W. LAMSON, a citizen of the United States, residing at Chicago, in the county of Cook and State of Illinois, have invented certain new and useful Improvements in Plastic-Pavement Plants, of which the following is a specification.

The object of my invention is to produce a simple but efficient portable plant for the production of pavement plastic, the apparatus being especially designed as a repair plant, although not necessarily limited to such use.

The accompanying drawings illustrate my invention.

Figure 1:
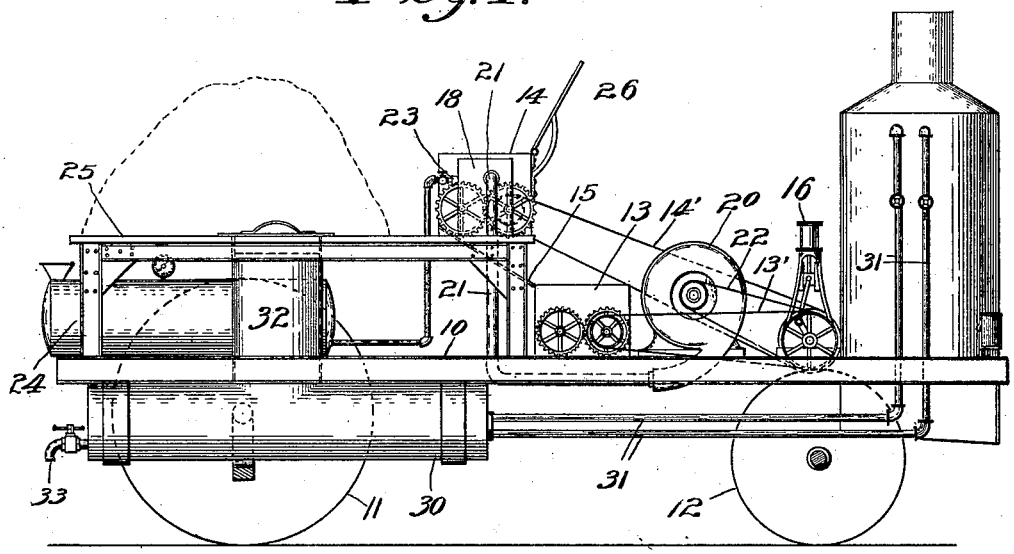
Figure 2:
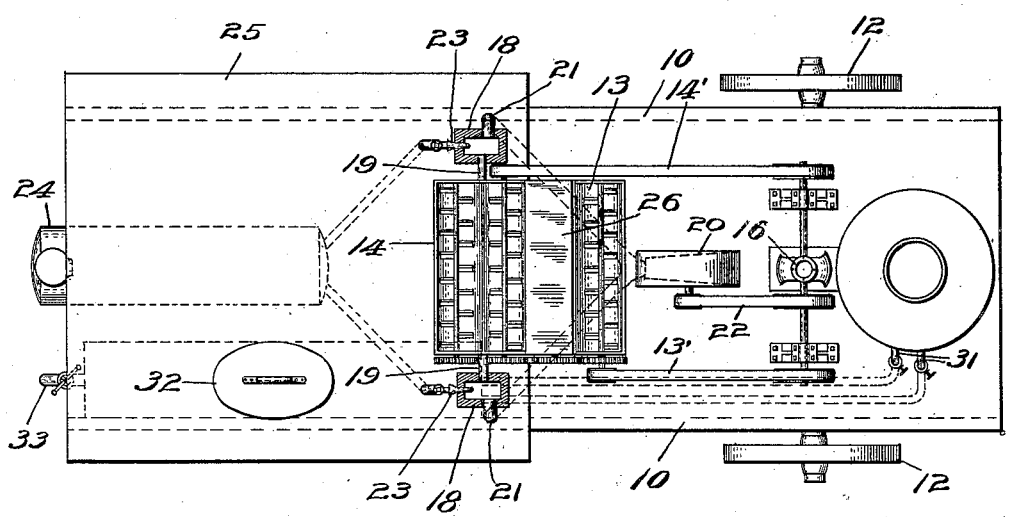

Figure 1 is a side elevation of an apparatus embodying my invention; Fig. 2 a plan.

In the drawings 10 indicates a platform mounted upon suitable carrying trucks 11 and 12 of any desired form. Arranged upon platform 10, about midway, or at least preferably between the trucks 11 and 12, is an ordinary mixer 13 which discharges through its bottom so that a wheelbarrow or other carrier may be placed beneath the platform 10 between the trucks 11 and 12 to receive the mixed material. Arranged adjacent mixer 13 to one side and above the said mixer is a similar mixer 14 which discharges upon an incline 15 which leads directly to the mixer 13. The two mixers are driven by suitable belts 13' and 14' respectively, from a small engine 16 of any desired type, an ordinary steam engine being shown in the drawings, and therefore accompanied by a proper steam generator. The mixer 14 is provided for the purpose of drying the sand, gravel, stone, or other solid which is to be used in the production of pavement plastic, and it is my intention not only to dry this material but to heat it to such degree that, when discharged into the mixer 13, it will have a sufficient number of heat units to melt the cement which is to be mixed therewith. In order to accomplish this result I provide, preferably at each side of the mixer 14, and closely adjacent thereto, a small furnace 18 formed preferably of fire brick, and leading into each end of the mixer 14, preferably above the mixer blades, is a pipe 19 through which the heated material within the furnace 18 may be blown into the mixer 14. Leading into each of the furnaces 18 from a blower 20 is a pipe 21, the blower being driven by a suitable belt 22 from the engine. Leading into each furnace 18 is an oil burner 23 which obtains its oil supply from a suitable reservoir 24 arranged on platform 10 and within which the fuel is held under pressure. Built upon platform 10, over the reservoir 24, and adjacent the mixer 14, is a platform 25, upon which may be piled the stone or sand. The mixer 14 is preferably provided with a cover 26 which will retain the heat in the mixer 14.

The operation is as follows: The oil burners 23 introduce a hot blast into the furnaces 18 so that a blast of air driven through pipes 21 into said furnaces passes through said furnaces and out through pipes 19 into the mixer 14. The sand or stone thrown into mixer 14 will be thoroughly mixed and heated by this heat, the thorough and continuous mixing preventing any burning. When the charge has become sufficiently heated it is discharged downwardly along the incline 15 directly into the mixer 13, and thereupon a sufficient amount of cement, such as asphalt, coal tar, etc., is thrown into mixer 13, preferably in medium sized chunks, and the entire mass thoroughly stirred by the mixer 13. The initial heat of the charge of sand or stone will soften the cement to such an extent that it will become thoroughly mixed therewith and when so mixed the mixture may be discharged from the mixer 13.

If desired, a melting tank 30 may be suspended beneath platform 10 and provided with steam pipes 31. Tank 30 may be charged with lump cement through a suitable charging pipe 32 and the melted cement drawn from a faucet 33 and put into the mixer 13.

I claim as my invention:

1. In a paving plant, the combination, with a stirring mechanism, of means for driving heated gases thereinto, and a second stirring mechanism arranged beneath the first stirring mechanism to receive material by gravity directly from the first stirring mechanism.

2. In a paving plant, the combination, with a portable platform, of a mixer carried thereby, a second mixer arranged above the first mixer and adapted to discharge into said first mixer, an oil furnace, a supply tank for said oil furnace, a communication between the oil furnace and the second mixer, a blower for blowing air through said oil furnace into the second mixer, substantially as and for the purpose set forth.

3. In a paving plant, the combination, with a portable platform, of a mixer carried thereby, a second mixer arranged above the first mixer and adapted to discharge into said first mixer, an oil furnace, a supply tank for said oil furnace, a communication between the oil furnace and the second mixer, a blower for blowing air through said oil furnace into the second mixer, and a storage platform arranged adjacent the second mixer, substantially as and for the purpose set forth.

4. In a paving plant, the combination, with a mixer having stirring blades adapted to raise and stir the material in the mixer, of a heater, means for driving heated gases from the heater into the upper portion of the mixer, and a second mixer arranged beneath the first mixer in position to receive the discharge directly therefrom.

In witness whereof, I, have hereunto set my hand and seal at Indianapolis, Indiana, this 30th day of March, A. D. one thousand nine hundred and seven.

GEORGE W. LAMSON. [L. S.]

Witnesses:
ARTHUR M. HOOD,
THOMAS W. MCMEANS.